Figures 1, 2:
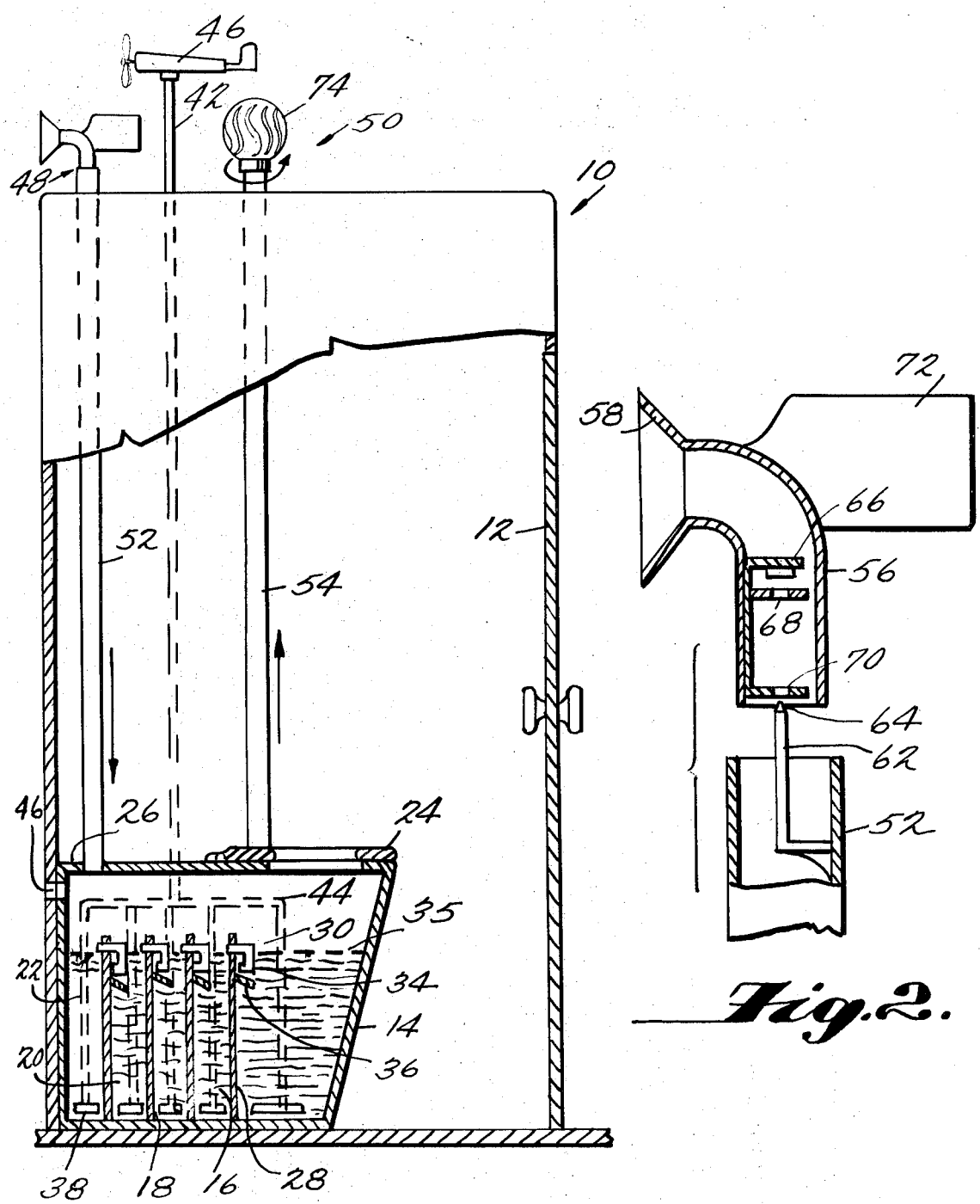

United States Patent [19]

Hargraves

[11] 3,776,383

[45] Dec. 4, 1973

[54] SEWAGE TREATMENT VENTING SYSTEM

[76] Inventor: William J. Hargraves, 121 Lake Highlander, Dunedin, Fla. 33528

[22] Filed: Apr. 19, 1971

[21] Appl. No.: 135,352

[52] U.S. Cl............... 210/199, 210/201, 210/218, 210/221, 4/115, 4/116
[51] Int. Cl............................................ B01d 43/00
[58] Field of Search................... 210/63, 199, 201, 210/209, 218, 539; 4/115, 116

[56] References Cited
UNITED STATES PATENTS

| 3,074,076 | 1/1963 | Kersten | 4/116 |
| 3,423,766 | 1/1969 | Eger | 4/115 |
| 3,440,669 | 4/1969 | Boester | 4/115 X |
| 2,798,228 | 7/1957 | Boester | 210/63 X |

Primary Examiner—Samih N. Zaharna
Assistant Examiner—F. F. Calvetti
Attorney—Cushman, Darby & Cushman

[57] ABSTRACT

A portable toilet facility includes a plurality of series-connected aerobic digestion tanks within a walled enclosure. Venting of the air spaces of the tanks is accomplished with a vane-type air scoop which faces into the wind and conducts air to one of the air spaces, an exhaust vent conduit extending from one of the other air spaces to the exterior of the enclosure.

7 Claims, 2 Drawing Figures

PATENTED DEC 4 1973  3,776,383

INVENTOR
WILLIAM J. HARGRAVES

BY Cushman, Darby & Cushman
ATTORNEYS

SEWAGE TREATMENT VENTING SYSTEM

This invention relates to the venting of an enclosed sewage digestion system, particularly a toilet facility of a type which may be employed either as a permanent home facility or as a portable facility at construction sites and recreation areas.

FIG. 1 is a schematic elevational view, partly broken away, of a portable toilet facility embodying the principles of the present invention; and FIG. 2 is a fragmentary vertical sectional view of a portion of FIG. 1.

FIG. 1 illustrates a portable toilet facility including a walled enclosure 10 provided with a door 12 and a multistage aerobic digestion system. The digestion system includes a main digestion chamber 14 and a plurality of series-connected digestion chambers 16, 18, 20 and 22. A conventional hinged toilet seat 24 is mounted directly on the common top wall 26 of the chambers above the main digestion chamber 14. The chambers are defined by vertical partitions 28 extending between vertical side walls, and each chamber is connected to the next chamber via a conduit 30 which extends over the respective partition 28. Each conduit 30 is constructed of a double elbow assembly having a horizontally facing open upper end 32 disposed above the upper edge of the respective partition 28 and a horizontally facing open lower end 34 disposed below liquid level 35. The open lower ends 34 are disposed within quiet liquid chambers formed within the digestion chambers as by baffles 36.

Each of the digestion chambers is aerated with air delivered to the lower portion of the chamber by a diffuser 38. The air may be supplied by a wind driven air pump 40, as disclosed in my application Ser. No. 813,242, filed Apr. 3, 1969, which sucks air from the atmosphere and forces it downwardly through a supply pipe 42 to a header 44.

The digestion system operates to digest organic waste material in progressive stages beginning with the main chamber. The double elbow conduit 30 in the quiet liquid chamber within the main chamber 14 substantially prevents the passage of any raw solid sewage out of that chamber so that liquid passing to the chamber 16 has already received primary aerobic digestion. Similarly, the liquid entering each subsequent chamber 18, 20 and 22 is free of solids and has been subjected to further aerobic digestion. The flow of liquid from chamber to chamber results from an increase in liquid level in the main chamber 14 when waste enters that chamber. In the event of a serious overload, liquid may escape from the last chamber 22 through an overflow pipe 46.

In accordance with the present invention the air spaces above the liquid levels in the chambers are continuously vented to prevent odor in the enclosure 10 and to provide evaporation of the liquid in order to maintain a more or less constant liquid level. To this end there is provided an air scoop 48 which effects a positive pressure air flow into the air spaces and an exhaust vent 50 which carries away stale air so as to effect air circulation through the air spaces.

The illustrated air scoop 48 includes a fixed vertical stack 52 which connects at its lower end with the air space above the last chamber 22, and the vent 50 includes a vertical stack 54 extending from the air space above the main chamber 14 at a location to one side of the toilet seat 24. In the illustrated embodiment all the air spaces lie within a common chamber, although these spaces may be separated by partitions, provided that there is communication between the spaces.

The upper end of the air scoop stack 52 terminates above the roof of the enclosure 10 and is provided with a vane-type scoop assembly which swings to face into the prevailing wind. As shown in FIG. 2, the assembly includes an elbow conduit 56 defining at its upper end a horizontally facing funnel-shaped inlet 58. The lower downwardly facing end portion 60 of the assembly telescopes into the stack 52 and is supported by a fixed pin 62 for rotation about the axis of the stack 52. The upper end 64 of the pin engages the lower surface of a horizontal bracket 66 fixed to the inner surface of the elbow 56, and proper alignment of the elbow 56 is maintained by two further horizontal brackets 68,70 having vertical holes through which the pin 62 passes. A vertical vane 72 is secured to the exterior of the elbow 56 to react with the wind so as to rotate the elbow to a position at which the inlet 58 faces into the wind.

The vent stack 54 terminates above the roof of the enclosure 10 and is preferably provided with a reduced-pressure, draft-inducing device, such as a conventional rotating turbine vent assembly 74.

In operation of the venting system air under the pressure of the wind passes into the inlet 58, down the stack 52 into and across the common air space above the liquid in the digestion chambers and finally up the exhaust stack 54 under the low-pressure effect of the assembly 74. The continuous sweep of air removes any odors from the common air space. In addition, it causes evaporation of water from the chambers so as to offset the addition of liquid waste to the main chamber and thereby assist in maintaining a constant volume of liquid in the system.

The air used for aeration rises from the bottom of the liquid, and as it does so oxygen is absorbed by the liquid, while the air becomes saturated with water. The venting system draws the saturated air out into the atmosphere while replacing it with air of normally lower humidity. Preferably the system effects greater exhaust than intake pressure so that no odors will be forced into the room, rather, some of the air in the room will be drawn into the digestion chamber, which in turn brings fresh air into the room as replacement.

The broad principles of aerobic digestion of organic waste are well known and require no description here. While the invention has been described with reference to an aerobic system the invention is equally applicable to an anaerobic system.

What is claimed is:

1. An aerobic digestion treatment system for purifying organic waste material dissolved in or dispersed in water comprising: a main digestion tank defining a lower liquid-containing portion and an overlying air space and having inlet means for receiving undigested raw sewage; a plurality of secondary digestion tanks each having a lower liquid-containing portion and an overlying air space; liquid connecting means between said main digestion tank and one of said secondary digestion tanks and serially between said secondary digestion tanks for passing essentially solids-free liquid sequentially through said tanks, the air spaces of all said tanks being in communication with each other; air diffuser means for introducing air into the lower portion of each tank for aserating and mixing the liquid contents of each of said tanks; a walled enclosure surrounding said tanks; and means for continuously passing a sweep of atmospheric air through all said air spaces to remove odor and stale air containing water vapor and to cause evaporation of water from the surface of the liquid contents of each stage, said means including an air scoop for taking in atmospheric air from outside said walled enclosure and for delivering the air to the air space of one of said tanks and a vent conduit extending from the air space of a tank remote from said one tank to the atmosphere at a location outside said walled enclosure.

2. A system as in claim 1 wherein said air scoop comprises a vertical conduit having a lower end in communication with the air space of said one tank, an elbow having a horizontally facing open upper end and a vertically facing open lower end which is swivelly attached to the upper end of said vertical conduit for swinging movement about the axis of said conduit; and vane means associated with said elbow for reacting with the wind to cause said horizontally facing open end to face into the wind.

3. A system as in claim 2 wherein said elbow is swivelly attached to said vertical conduit by means of a fixed vertical pin disposed on the axis of said vertical conduit, said pin passing through an aperture in a bracket fixed to said elbow, and the upper end of said pin engaging the lower surface of a support structure fixed to said elbow.

4. A system as in claim 1 wherein said liquid connecting means between tanks includes a quiet liquid chamber formed within each tank and a conduit leading from the quiet liquid chamber to the aerated portion of the next downstream tank.

5. A toilet facility for receiving and purifying organic waste material comprising: a main digestion tank defining a lower water-containing portion and an overlying air space and having inlet means for receiving organic waste material; a plurality of secondary digestion tanks each having a lower water-containing portion and an overlying air space; liquid connecting means between said main digestion tank and one of said secondary digestion tanks and serially between said secondary digestion tanks for passing essentially solids-free liquid sequentially through said tanks, said liquid connecting means including a quiet liquid chamber formed within each tank and a conduit leading from the quiet liquid chamber to the next downstream tank, the air spaces of all said tanks being in communication with each other; air diffuser means for introducing air into the lower portion of each tank for aerating and mixing the liquid contents of each tank; a walled enclosure surrounding said tanks; means for removing odor and stale air containing water vapor and to cause evaporation of water from the surface of the liquid contents of each stage, said means including atmospheric air inlet means and vent means connected at remote locations to said air spaces for continuously passing a sweep of atmospheric air through all said air spaces.

6. A toilet facility as in claim 5 wherein said air inlet means includes a vane-type air scoop which swings to face into the prevailing wind.

7. A toilet facility as in claim 5 wherein said vent means includes a draft-inducing device which effects a reduced pressure which tends to draw ambient air into said air spaces.

* * * * *